Patented Apr. 8, 1941

2,237,825

UNITED STATES PATENT OFFICE 2,237,825

POLYMERS OF ACYLATED CYCLOPENTADIENES

Anderson W. Ralston, Robert J. Vander Wal, and Stewart T. Bauer, Chicago, Ill., assignors to Armour and Company, Chicago, Ill., a corporation of Illinois No Drawing. Application September 2, 1938, Serial No. 228,259

8 Claims. (Cl. 260—93)

This invention pertains to acylated cyclopentadienes and polymers derived therefrom, and it comprises processes wherein cyclopentadienes are reacted with fatty acid chlorides containing at least twelve carbon atoms in the presence of metallic chlorides to produce acylated polymers.

Cyclopentadienes, of which dicyclopentadiene is most available, are of considerable interest in the resin field. The production of resins by heating cyclopentadiene has been described by Carmody, Sheehan and Kelly, Ind. & Eng. Chem. 30, 245–51, (1938). However, resins produced from the cyclopentadienes are quite soft and large scale commercial use thereof will depend upon a substantial improvement in their physical properties.

We have discovered a new class of synthetic resins which can be prepared from the cyclopentadienes and which possess valuable properties. These plastics are much harder than those prepared by heat polymerization of the cyclopentadienes and they may also possess drying properties which enable them to be used as constituents of lacquers or protective coatings. We prepare these resins by the action of fatty acid chlorides, such as stearyl chloride, lauryl chloride, oleyl chloride, linoleyl chloride or linolenyl chloride, upon cyclopentadienes in the presence of metallic chlorides, such as aluminum chloride, by a typical Friedel-Crafts procedure. In our reaction the acylation of the cyclopentadienes proceeds simultaneously with their polymerization so that a series of acylated resins is obtained, the members of which possess individual properties dependent upon the fatty acid chloride used or the proportions of the reactants which are employed. In cases where unsaturated fatty acid chlorides are employed the resulting products possess drying properties which enable them to be used in lacquers, varnishes, etc. These products are all ketonic in nature and can be broadly defined as acylated cyclopentadienes.

The following examples can be given as descriptive of the preparation and properties of these products:

Example 1

Twenty grams of aluminum chloride are suspended in 50 cc. of tetrachloroethane in a three-necked flask equipped with a stirrer, dropping funnel and thermometer. To this is added slowly 30 grams of oleyl chloride in 25 cc. of tetrachloroethane, the temperature being held below 25° C. during the addition. Twenty-two grams of a 60 percent solution of dicyclopentadiene in tetrachloroethane is added over a period of approximately two hours at 20–35° C. The temperature is then raised to about 45–60° C. for a period of two hours. The resulting product is then hydrolyzed by pouring on ice and the solvents removed by steam distillation. The product is dissolved in ether, washed with water and dried with anhydrous sodium sulfate. This gives a soft resin insoluble in water, soluble in chlorinated hydrocarbon solvents, slightly soluble in alcohol and acetone.

Example 2

Twenty grams of aluminum chloride, 30 grams of oleyl chloride and 44 grams of dicyclopentadiene are treated as described under Example 1. Tetrachloroethane is employed as the solvent. The product is a resin, harder than that described under Example 1.

Example 3

Twenty grams of aluminum chloride, 30 grams of oleyl chloride and 220 grams of dicyclopentadiene solution are reacted, using tetrachloroethane as the solvent, as described under Example 1. The product is a hard, light-colored resin.

Example 4

Twenty grams of aluminum chloride, 30 grams of stearyl chloride and 110 grams of dicyclopentadiene solution are reacted as described under Example 1. The product is a soft resin.

Example 5

Twenty grams of aluminum chloride, 30 grams of linolenyl chloride and 50 grams of dicyclopentadiene solution are reacted as described under Example 1. The product is a soft resin which dries to a hard film when spread upon a metal surface and exposed to elevated temperatures.

Example 6

Twenty grams of aluminum chloride, 20 grams of lauryl chloride and 44 grams of dicyclopentadiene solution are reacted as described under Example 1. The product is a light-colored resin.

Example 7

Twenty grams of aluminum chloride, 44 grams of mixed palmityl and stearyl chlorides and 44 grams of dicyclopentadiene solution are reacted as described under Example 1. The product is a resinous mass resembling that described under Example 2.

All of the above described resins differ greatly from those obtained by the heat polymerization of cyclopentadiene solutions themselves in that they are generally harder. Most of them are solids and those prepared from the highly unsaturated fatty acid chlorides have drying properties. The proportion of fatty acid chloride to the cyclopentadiene can be varied over wide limits. Generally we find the hardest resins to result when the molucular proportion of fatty acid chloride to the cyclopentadiene is about one to five. These resins are formed by the simultaneous polymerization and acylation of the cyclopentadienes, the hydrogen chloride liberated during the reaction serving as a polymerization catalyst.

We wish to clearly distinguish this invention from those describing the preparation of resins prepared from the cyclopentadienes and plasticized by the addition of ketones or like materials. In this invention the plastic and resinous properties of the products are due to their chemical nature and not to the addition of other components.

We have found that the products prepared as described above can be used for insulating wires, coating metals for protection against corrosion, as plasticizers for other resins, in varnishes, lacquers and various coatings used for protecting or ornamenting wood and metal and also they are adaptable to most uses in the general plastic field.

While our description has been limited to the use of a few specific fatty acid chlorides it is, of course, evident that any fatty acid chloride containing at least twelve carbon atoms in the molecule would be usable. Thus fatty acid chlorides such as lauryl, myristyl, palmityl, stearyl, oleyl, linoleyl and linolenyl chlorides or mixtures of the same could be used. Fatty acid chlorides made from fatty acids prepared by the oxidation of paraffin wax or other hydrocarbons can also be used. The products have been obtained by typical Friedel-Crafts reaction, that is, a substantially molecular proportion of metallic chloride to fatty acid chloride must be employed and the aluminum chloride must be removed by hydrolysis. In the appended claims when we refer to "a cyclopentadiene" we mean either cyclopentadiene or polymerization products thereof, such as dicyclopentadiene, or trimers and tetramers, etc. where cyclopentadiene is the essential polymerizing component thereof.

Having thus described our invention, what we claim is:

1. The process of preparing an acylated cyclopentadiene polymer which comprises reacting a cyclopentadiene with a fatty acid chloride in substantial amounts in the presence of a Friedel-Crafts catalyst, the acid chloride having at least twelve carbon atoms, hydrolyzing the resulting reaction product and recovering a catalyst-free, acylated cyclopentadiene polymer.

2. The process as in claim 1 wherein the fatty acid chloride is stearyl chloride.

3. The process as in claim 1 wherein the fatty acid chloride is oleyl chloride.

4. The process as in claim 1 wherein the fatty acid chloride is linoleyl chloride.

5. The resinous reaction product obtained by reacting cyclopentadiene with a fatty acid chloride in substantial amounts in the presence of a Friedel-Crafts catalyst, the acid chloride having at least twelve carbon atoms, hydrolyzing the resulting reaction product, and recovering a resinous, catalyst-free acylated cyclopentadiene polymer.

6. The product as in claim 5 wherein the fatty acid chloride used is stearyl chloride.

7. The product as in claim 5 wherein the fatty acid chloride used is oleyl chloride.

8. The process as in claim 5 wherein the fatty acid chloride used is linolyl chloride.

ANDERSON W. RALSTON.
ROBERT J. VANDER WAL.
STEWART T. BAUER.